(12) United States Patent
Nishimae et al.

(10) Patent No.: US 9,322,450 B2
(45) Date of Patent: Apr. 26, 2016

(54) TORQUE ROD

(71) Applicants: YAMASHITA RUBBER KABUSHIKI KAISHA, Fujimino-shi, Saitama (JP); HONDA MOTOR CO., LTD., Tokyo (JP)

(72) Inventors: Hironao Nishimae, Fujimino (JP); Nobuo Kubo, Wako (JP); Hiroshi Yanagase, Wako (JP)

(73) Assignees: YAMASHITA RUBBER KABUSHIKI KAISHA, Fujimino-Shi (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/194,958

(22) Filed: Mar. 3, 2014

(65) Prior Publication Data

US 2014/0175718 A1 Jun. 26, 2014

Related U.S. Application Data

(62) Division of application No. 12/142,214, filed on Jun. 19, 2008, now Pat. No. 8,684,341.

(30) Foreign Application Priority Data

Jun. 20, 2007 (JP) ................... 2007-163206

(51) Int. Cl.
| | |
|---|---|
| F16F 5/00 | (2006.01) |
| F16F 13/04 | (2006.01) |
| F16F 1/38 | (2006.01) |
| F16F 7/08 | (2006.01) |
| F16F 15/02 | (2006.01) |

(52) U.S. Cl.
CPC ............... *F16F 13/04* (2013.01); *F16F 1/3849* (2013.01); *F16F 7/08* (2013.01); *F16F 15/022* (2013.01)

(58) Field of Classification Search
CPC ............ F16F 13/14; F16F 1/387; F16F 1/371
USPC ............ 267/140.11, 140.12, 140.4, 141, 292, 267/293, 153
See application file for complete search history.

(56) References Cited

U.S. PATENT DOCUMENTS

| | | | |
|---|---|---|---|
| 4,951,930 A | 8/1990 | Uno et al. | |
| 5,152,510 A | 10/1992 | Komabashiri | |
| 6,321,890 B1 | 11/2001 | Suzuki et al. | |
| 6,651,966 B2 * | 11/2003 | Hettler ...................... | 267/140.12 |
| 2005/0206057 A1 * | 9/2005 | Endo ............................. | 267/292 |

FOREIGN PATENT DOCUMENTS

JP         8-233030         9/1996

* cited by examiner

*Primary Examiner* — Robert A Siconolfi
*Assistant Examiner* — Mahburbur Rashid
(74) *Attorney, Agent, or Firm* — Rankin, Hill & Clark LLP

(57) ABSTRACT

A torque rod having an arm portion, a ring portion formed on each end of the arm portion in a longitudinal direction of the arm portion, and a rubber bushing that is integrally provided with the ring portion. The arm portion is formed from a material that is lower in specific gravity than iron. A weight is provided in a potion of the rubber bushing other than a principal spring portion. The principle spring portion, which absorbs principle vibration to be isolated, is formed by an elastic arm portion that extends radially outwardly from an inner cylinder located substantially in a center of the rubber bushing and is connected to the ring portion. An aperture, which is a separation space, is provided between the elastic arm portion and the ring portion.

5 Claims, 8 Drawing Sheets

TORQUE ROD

BACKGROUND OF THE INVENTION

1. Field of the Invention

The present invention relates to a torque rod for use in an engine mount for a motor vehicle.

2. Description of the Related Art

It is already known to isolate vibration by letting the whole of a torque rod, which comprises an arm portion and bushings provided at each end in the longitudinal direction of the arm portion, function as a dynamic damper. There is also known the art that the arm portion is formed integral with a ring portion which surrounds the bushing, and the arm portion and the ring portion are made of resin so as to reduce weight. By the way, mass as the dynamic damper is decreased by being made of resin, so that resonance frequency becomes higher. Therefore, there is disclosed another torque rod that weight (mass) is mounted on the arm portion to adjust the resonance frequency to resonate at comparatively low frequency of about 100 Hz for example (see a patent reference 1).

Patent reference 1: Japanese patent laid-open publication No. H08-233030.

Incidentally, in the case where the weight is mounted on the arm portion as disclosed in the above prior art, it will take time and effort and increase in assembling man-hour. Also, in this case, since the arm portion is bent repeatedly by vibration, there is a possibility of disengagement of the weight in the long term use which is attached externally, thereby making an improvement in durability difficult. If the weight is integrally embedded in the rubber bushing, there is a possibility that spring characteristics of the rubber bushing is influenced so as to have the vibration isolating property varied. In addition, since the weight projects outwardly from the arm portion by being attached externally, it is essential to consider the layout not to come into contact with other neighboring parts.

It is therefore an object of the present invention to improve the durability by attaching the weight in such a way as not to be out of place through the long term use, and to make the layout easy without exerting an influence upon the spring characteristics of a principal spring section of the rubber bushing and without substantial external projection of the weight.

SUMMARY OF THE INVENTION

To solve the above mentioned disadvantages, a torque rod in accordance with a first aspect of the present invention comprises an arm portion being formed of a material having a lower specific gravity than iron, rubber bushings being integrally provided with ring portions which are formed on each end in the longitudinal direction of the arm portion, wherein a weight is provided in a portion of the bushing other than a principal spring portion which absorbs principal vibration to be isolated.

In accordance with a second aspect of the present invention, the principal spring portion is comprised of an elastic arm portion which extends radially outwardly in the shape of an arm from an inner cylinder located substantially in a center of the rubber bushing and is connected to the ring portion, and an aperture which is separation space is provided between the elastic arm portion and the ring portion.

In accordance with a third aspect of the present invention, the weight is provided integral with rubber in a portion other than the elastic arm portion of the rubber bushing.

In accordance with a fourth aspect of the present invention, the weight is located in the vicinity of the aperture.

In accordance with a fifth aspect of the present invention, the weight is provided in a stopper which faces the aperture.

In accordance with a sixth aspect of the present invention, the weight is provided on a connecting portion between an outer peripheral portion of the rubber bushing and the ring portion, wherein the weight is fixed to an inner peripheral wall of the ring portion by connection of the rubber busing to the ring portion.

In accordance with a seventh aspect of the present invention, the weight is fitted into a concave portion recessed in the inward direction of the inner peripheral wall of the ring portion such that the weight is located on an outside of a restraint line of the rubber bushing by the ring portion.

In accordance with an eighth aspect of the present invention, the material having a lower specific gravity than iron is comprised of resin or light alloy.

According to the invention as defined in the first aspect, since the weight is provided in a portion other than the principal spring portion of the rubber bushing, the deformation of the weight and the rod because of the vibration is absorbed by the rubber, whereby there is no possibility that the weight is separated from and drops off the rigid body side, thereby to improve the durability. Moreover, since the integration can be performed at the time of baking of the rubber bushing to the ring portion, the extra mounting process is not required thereby to improve workability. In addition, the weight is united with the rubber so as to be hardly exposed, thereby making the layout easy.

According to the invention as defined in the second aspect, the principal spring portion is comprised of the elastic arm portion which extends radially outwardly in the shape of an arm from the inner cylinder to the ring portion, and the aperture is provided between the elastic arm portion and the ring portion, in such a way as to have the weight arranged in the portion other than the elastic atm portion. Therefore, the weight can be mounted in a durable fashion and exerts no influence upon the spring characteristics of the rubber bushing.

According to the invention as defined in the third aspect, since the weight is provided integral with the rubber in the portion other than the elastic arm portion, it exerts no influence upon the principal spring portion.

According to the invention as defined in the fourth aspect, since the weight is located in the vicinity of the aperture, the weight is provided without exerting any influence upon the principal spring portion.

According to the invention as defined in the fifth aspect, since the weight is provided in the stopper which faces the aperture, the weight is provided without exerting any influence upon the principal spring portion. Also, since the stopper has comparatively wide space for mounting the weight, it is possible to put the stopper to effective use of mounting the weight. Moreover, the rigidity of the stopper can be enhanced by the rigidity of the weight thereby making it possible to show the function as a stopper.

According to the invention as defined in the sixth aspect, since the weight is provided on the connecting portion between the outer periphery of the rubber bushing and the ring portion, and the weight is fixed by rubber in contact with the inner peripheral wall of the ring portion at the time of baking the rubber bushing, the weight, even if it contacts the ring portion of rigid body, can be mounted in a relatively movable fashion without being influenced by the mutual deformation thereby to improve the durability.

According to the invention as defined in the seventh aspect, since the concave portion is recessed outside of the restraint line formed on an inner peripheral wall of the ring portion, and the weight is fitted into the concave portion and covered by the rubber bushing, the weight can be fixed outside of the restraint line. Also, the weight can be mounted without exerting the influence upon the principal spring portion. At the same time, the accurate mounting of the weight can be done.

According to the invention as defined in the eighth aspect, al least the ring portion and the arm portion are formed of the material having a lower specific gravity than iron, so that even if the total mass is decreased, the resonance frequency can be lowered by the weight and can be tuned to the frequency necessary for isolating the vibration.

DETAILED DESCRIPTION OF THE PREFERRED EMBODIMENT

Figure 1:
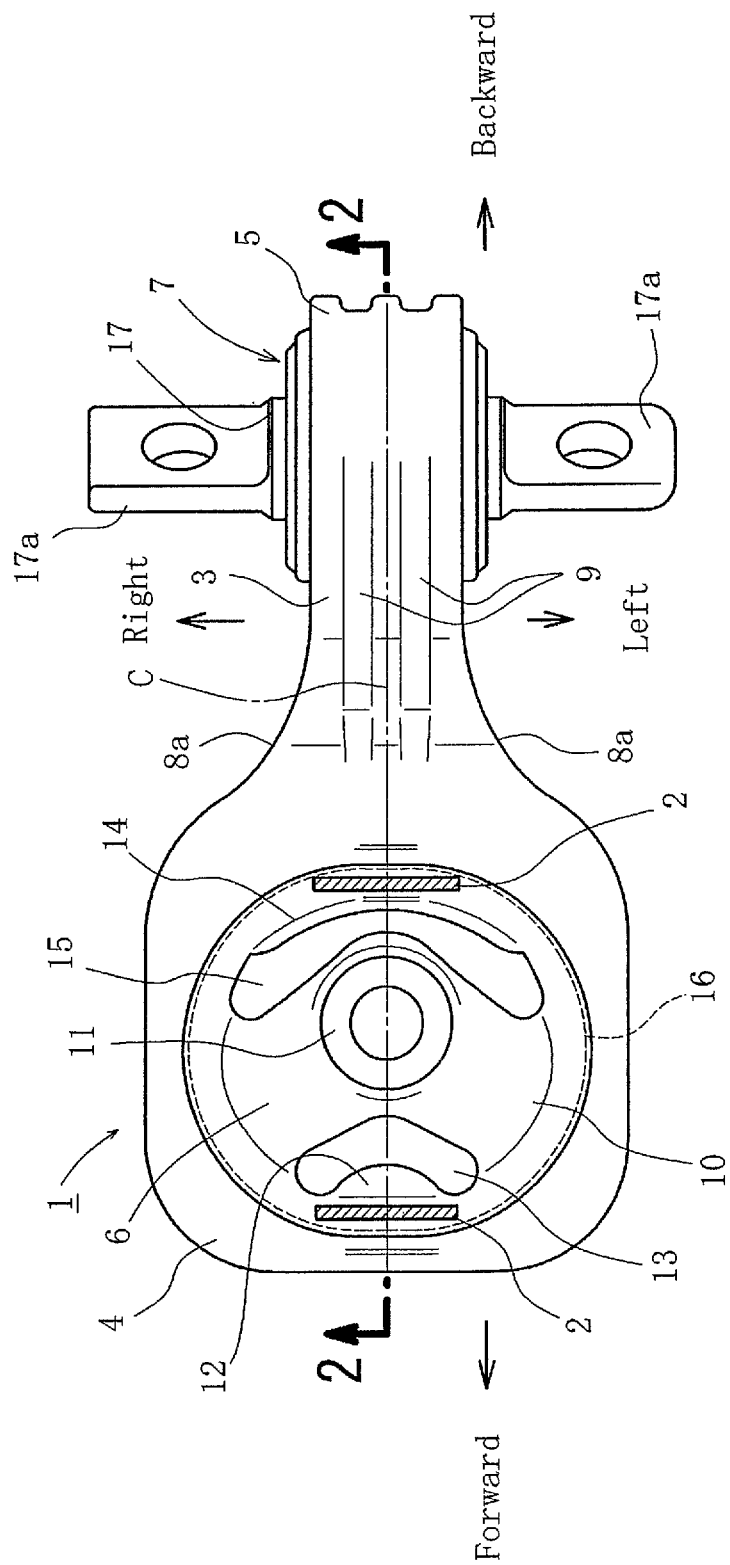
FIG. 1 is a plan view of a torque rod according to the first embodiment of the present invention.
Figure 2:
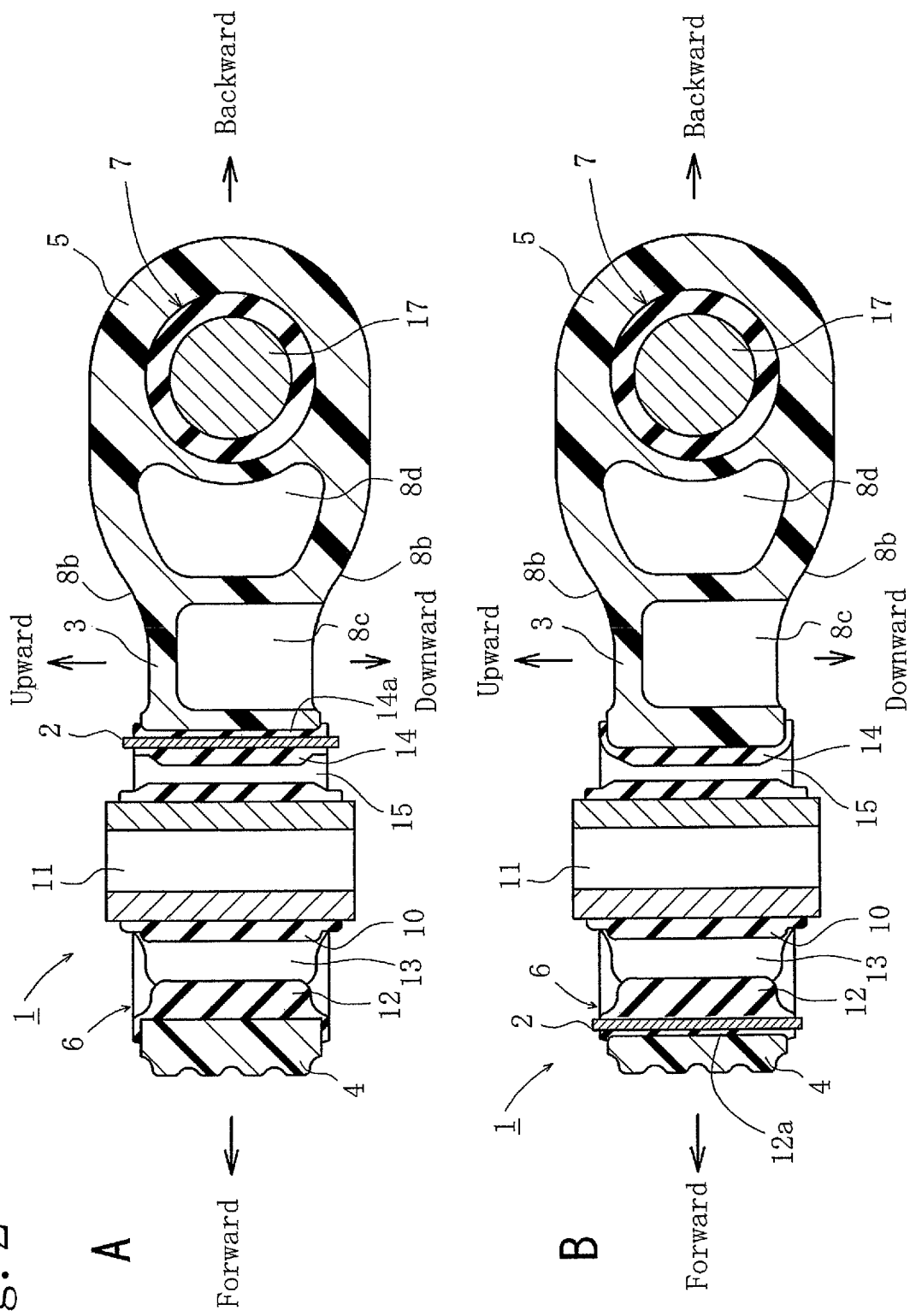
FIG. 2 is a cross sectional view taken along line 2-2 of FIG. 1.

FIG. 1 and FIG. 2 show a torque rod 1 for supporting a motor vehicle engine according to the embodiment of the present invention, wherein FIG. 1 is a plan view and FIG. 2 is a cross sectional view taken along line 2-2. Further, FIG. 1 shows the state that two weights 2 (shown by hatching) are provided at the same time in two different locations. FIG. 2 shows two modes as FIG. 2-A and FIG. 2-B that only one weight 2 is provided in either of two different locations of FIG. 1. The weight 2 may be provided in pairs or more at the same time in different plural locations as shown FIG. 1 or alternatively, it may be provided alone in either of the locations as shown in FIG. 2-A or FIG. 2-B.

Referring now to these drawings, the torque rod 1 has an arm portion 3 and ring portions 4, 5 formed integral with the arm portion 3 in each end in the longitudinal direction thereof. Bushings 6 and 7 each are integrally provided in the ring portions 4, 5. The arm portion 3 and the ring portions 4, 5 are integrally formed of resin (for example, 6-6 nylon having specific gravity of 1.5). The ring portions 4, 5 are different in size and hereinafter, the larger one is referred to as large ring portion 4 while the smaller one is referred to as small ring portion 5. The larger ring portion 4 is larger than the smaller ring portion 5 and is formed in a general square shape. A round portion 8a of the larger ring portion 4 is integrally connected continuously to the arm portion 3. A region between the arm portion 3 and the large ring portion 4 is reinforced by a reinforcing rib 9.

The small ring portion 5 opens in a direction at right angles to the large ring portion 4 (though it may open in the same direction) and is smaller than the large ring portion 4. The arm portion 3 and the small ring portion 5 are also integrally and continuously connected through a round portion 8b to each other. Rubber bushings are integrally provided inside of each of the ring portions. The rubber bushings are comprised of a bushing 6 provided in the large ring portion 4 and a bushing 7 provided in the small ring portion 5. These bushings 6, 7 are different in size, and hereinafter, the larger one is referred to as large bushing 6 while the smaller one is referred to as small bushing 7. In FIG. 2, the reference character 8c denotes a downwardly opened lightening recess, and the reference character 8d denotes a lightening through hole extending in the right and left direction.

The large bushing 6 is larger than the small bushing 7 and is integrally connected to the inside of the large ring portion 4. The large bushing 6 is comprised of a vibration isolating rubber provided inside of the large ring portion 4 while surrounding an inner cylinder 11. The large bushing 6 has a pair of elastic arm portions 10 in the shape of an arm. The pair of elastic arm portions 10 each extends right and left in opposite directions from the inner cylinder 11 in the illustrated state in FIG. 1 and has a distal end connected to an inner peripheral wall of the ring portion 4, so that the large ring portion 4, the large bushing 6 and the inner cylinder are united as one body.

When a center line C passing through a center of the inner cylinder 11 and a center in the width direction of the arm portion 3 is arranged to extend in parallel with the forward and backward direction of a vehicle, the pair of elastic arm portions 10 projects backwardly so as to be formed into a general V-shape in a plan view. The elastic arm portion 10 is a portion functioning as principal spring for absorbing the vibration as a rubber spring when the vibration inputted to the large bushing 6 is isolated. The pair of elastic arm portions 10 is formed in a V-shape thereby to have the spring value in the forward and backward direction differed from the spring value in the right and left direction, and projects backwardly in the forward and backward direction thereby to increase the spring value when the inner cylinder 11 is moved forwardly relative to the large ring portion 4 (or when the large ring portion 4 is relatively moved backwardly). On the forward side of the inner cylinder 11, a forward stopper 12 which is integrally connected to a forward inner peripheral wall of the large ring portion 4 is provided across a forward aperture 13. The forward aperture 13 is a through hole in a general V-shape in a plan view. The forward stopper 12 projects backwardly into the forward aperture 13 and is formed in a general mountain shape.

A backward stopper 14 is also formed in a general mountain shape and is integrally attached to a backward inner peripheral wall of the large ring portion 4. A backward aperture 15 is provided between the backward stopper 14 and the elastic arm portion 10. The backward aperture 15 is also formed in a general V-shape and is a through hole extending right and left along the elastic arm portion 10 while the center portion thereof projects backwardly. A backward stopper 14 has a center portion projecting backwardly in a curved shape in such a manner that the forward end of the backward stopper forms a backward side of the backward aperture 15.

The forward aperture 13 and the backward aperture 15 each are a lightening hole passing through in the axial direction, that is, in the vertical direction of the drawing. An opening width of each of the apertures in the forward and backward direction is adjusted in such a manner that the inner cylinder 11 can be moved a predetermined stroke relative to the large ring portion 4 in the forward and backward direction. The forward stopper 12 or the backward stopper 14 receives and buffers the motion of the inner cylinder 11 when the inner cylinder 11 comes into contact with the forward stopper 12 or the backward stopper 14 in the vicinity of stroke limits. The stroke amount is adjusted by the projecting amount of each of the stoppers to the inner cylinder 11. The forward stopper 12 and the backward stopper 14 are separated each from the elastic arm portions 10 by the forward aperture 13 and the backward aperture 15, so as not to provide the spring power as a vibration isolating device in comparison with the elastic arm portions 10 constituting the principal spring. However, while each of the stoppers creates spring force at the time of compressive deformation when the inner cylinder 11 comes into contact with the stopper in the vicinity of the stroke limits, this is not the function as the principal spring but the function simply as the stopper for buffering or absorbing the shock at the time of contact.

The weight 2 is a mass body comprising a metal plate and is integrally embedded in the forward stopper 12 and the backward stopper 14 in FIG. 1. As described below, however, it may be provided in either of the stoppers. Each of upper and lower ends of the weight 2 projects from the forward stopper 12 and the backward stopper 14 so as to be merely partially exposed. However, most of the weight 2 is integrally embedded in the rubber of the large bushing 6. Incidentally, the quality of material and shape of the weight 2 are not limited to the one in the embodiment. Various changes may be made. The mass of the weight 2 is so adjusted that the resonance as a dynamic damper of the whole of the torque rod 1 on which the weight is mounted is created in the predetermined resonance range to be vibration-isolated. To be concrete, the weight 2 is set to isolate or absorb the vibration of around 100 Hz which is easy to be sensible to the human body.

This setting is determined not only by the mass of the weight 2 but also by correlation between the total spring value of the principal spring in the large bushing 6 and the small bushing 7, and the total mass of rigid body portion including the arm portion 3, the large ring portion 4, the small ring portion 5 and the weight 2. Therefore, the mass of the weight 2 may be adjusted such that the mass of the rigid body portion of the whole torque rod 1 (total mass of the rigid body portion) becomes the predetermined target value.

The reference character 16 is a restraint line and is formed by a joining surface between the inner peripheral wall of the large ring portion 4 and the outer peripheral wall of the large bushing 6. The weight 2 is arranged in a location inside (on the side of the inner cylinder 11) of the restraint line 16. The inner cylinder 11 of the large bushing 6 is connected to the vehicle body side through a bolt (not shown) inserted into an axial hole thereof. On the other hand, an inner shaft 17 of the small bushing 7 projects in the right and left direction so as to form a pair of flattened mounting portion 17a which is connected to the engine (not shown) through a bolt.

FIG. 2-A shows the case where the weight 2 is provided in the backward stopper 14. The weight 2 is integrally embedded in the backward stopper 14 comprised of the rubber of the large bushing 6 in such a state that the cross section of the weight extends in parallel with the inner peripheral wall of the large ring portion 4. Then, the weight 2 may be formed in an arc shape along the curved surface of the inner peripheral wall of the arc-shaped large ring portion 4 or alternatively, in a simple flat shape. If it is in a flat shape, although an intermediate portion thereof is much away from the inner peripheral wall of the large ring portion 4, there is no problem because it is embedded in the rubber and connected through the rubber to the inner peripheral wall of the large ring portion 4 (see FIG. 1 showing an example of this flat weight).

The connection between a side wall of the weight 2 and the inner peripheral wall of the large ring portion 4 is performed through a portion of the rubber constituting the backward stopper 14. Accordingly, since a rubber layer 14a lies between the side wall of the weight 2 and the inner peripheral wall of the large ring portion 4, the mutual connection is made by this rubber layer 14a in a state separated away from each other without direct contact, thereby making it possible to isolate the transmission of the vibration or other force. Therefore, even if the deformation due to the heat contraction after molding the resin elements and the heat expansion during operation is created in the large ring portion 4, this deformation is not directly transmitted to the weight 2 but transmitted through the elastic deformation of the rubber lying between both members, so that the deformation of the large ring portion 4 is absorbed by the elastic deformation of the rubber of the large bushing 6.

FIG. 2-B shows the case where weight 2 is provided in the forward stopper 12. The weight 2 is integrally embedded in the forward stopper 12 comprised of the rubber of the large rubber bushing 6, as similarly shown in FIG. 2-A. Accordingly, a side wall of the weight 2 is arranged in parallel with the forward inner peripheral wall of the larger ring portion 4 so as to be united as one body and is connected with the inner peripheral wall of the large ring portion 4 through a rubber layer 12a which is a portion of the rubber of the forward stopper 12. The rubber layer 12a lies between the weight 2 and the large ring portion 4 so that the deformation due to the heat expansion, etc. of the large ring portion 4 is isolated by the rubber layer 12a without being directly transmitted to the weight 2. Thus, the deformation of the large ring portion 4 is absorbed by the elastic deformation of the rubber of the forward stopper 12.

The small bushing 7 is comprised of a ring-shaped solid vibration isolating rubber which is injected between an inner peripheral wall of the small ring portion 5 and an outer peripheral wall of the inner shaft 17 to connect these members and is formed in a solid shape without a lightening portion such as an aperture in the circumferential direction thereof. Accordingly, on the side of the small bushing 7 the whole of the small bushing 7 constitutes the principal spring portion.

In the case of making this torque rod out of resin, firstly, the arm portion 3, the large ring portion 4 and the small ring portion 5 are molded as one body by a known injection molding method, etc. Then, after this is put in a die for forming a bushing, the inner cylinder 11 and the weight 2 are set inside of the large ring portion, while the inner shaft 17 is set inside of the small ring portion 5. Thereafter, the rubber is injected into the inside of each of the large ring portion 4 and the small ring portion 5 and is vulcanized thereby to obtain the torque rod 1 such that the weight 2, the inner cylinder 11 and the inner shaft 17 are connected integral with the large bushing 6 and the small bushing 7.

Contrary to the above, in the manufacture of the torque rod, the large bushing 6 and the small bushing 7 may be molded first integral with the inner cylinder 11, the inner shaft 17 and the weight 2. After setting these bushings in the injection molding die, the resin is injected, so that the torque rod formed integral with each of the bushings may be obtained. Herein, the resin molding method is not limited to the injection molding method.

In the case of carrying out the resin molding first as above, each of bushings is cooled and contracted after molding. Then, since the weight 2 is embedded in the rubber and the deformation is limited to the rubber itself even if the contraction is developed on the adhesion surface between the rubber and each of the ring portions, there is no influence upon the connecting relationship between the weight 2 and the large ring portion 4 so that the connecting region remains undestroyed so as not to be separated or damaged by the heat contraction. Similarly, in the case of carrying out the molding later, the heat contraction of the resin also is absorbed by the rubber layer 14*a* thereby not to exert the influence upon the weight 2. Therefore, there is no possibility that the connecting region with the weight 2 is destroyed by the heat contraction after the resin molding.

Next, the operation of the first embodiment will be described. When the vibration from the engine is transmitted to the torque rod 1 in such a state that the inner cylinder 11 and the inner shaft 17 are mounted each on the engine and the vehicle body, the torque rod 1 functions as a dynamic damper by the combination between the rubber spring comprised of the large ring portion 4 and the small ring portion 5 and the mass comprised of the arm portion 3, the large ring portion 4, the small ring portion 5 and the weight 2, and resonates at a predetermined frequency.

Then, by the provision of the weight 2, the arm portion 3, the large ring portion 4 and the small ring portion 5 decrease the resonant frequency, irrespective of being comprised of the light resin, so that the sensible vibration of around 100 Hz can be absorbed.

Further, since the weight 2 is arranged away from the elastic arm portion 10 functioning as the principal spring portion, the spring value of the principal spring portion is not changed by the weight 2 so as not to decrease the vibration isolating performance. Moreover, since the weight 2 is embedded in either the forward stopper 12 or the backward stopper 14, or both of them having comparatively enough room for arrangement of the weight without exerting the influence upon the vibration isolating performance, it is easy to provide the weight 2, there is no interference with the other component parts, and it is possible to improve in an external appearance and in freedom of layout.

Accordingly, it is possible to avoid such a situation that, for example, in the case of having the weight 2 embedded in the large ring portion 4, the heat contraction and the heat expansion exert the influence directly on the weight 2 thereby to cause cracks in the adhesion region. Further, since the weight 2 and the large ring portion do not come into direct contact with each other while the rubber layer 12*a* or 14*a* is interposed between them, the deformation by the vibration of the weight 2 and the large ring portion 4 is absorbed by the rubber so as not to be transmitted to the counterpart, whereby the heat deformation, etc. of each of them also are not transmitted to the counterpart. Therefore, there is no possibility that the weight 2 is separated from and falls off the ring portion 4 even in the long term use, thereby making it possible to improve the durability. The forward stopper 12 and the backward stopper 14 can be improved in rigidity by having the weight 2 arranged in the forward stopper 12 and the backward stopper 14, so that the stopper function can be enhanced.

Figure 3:
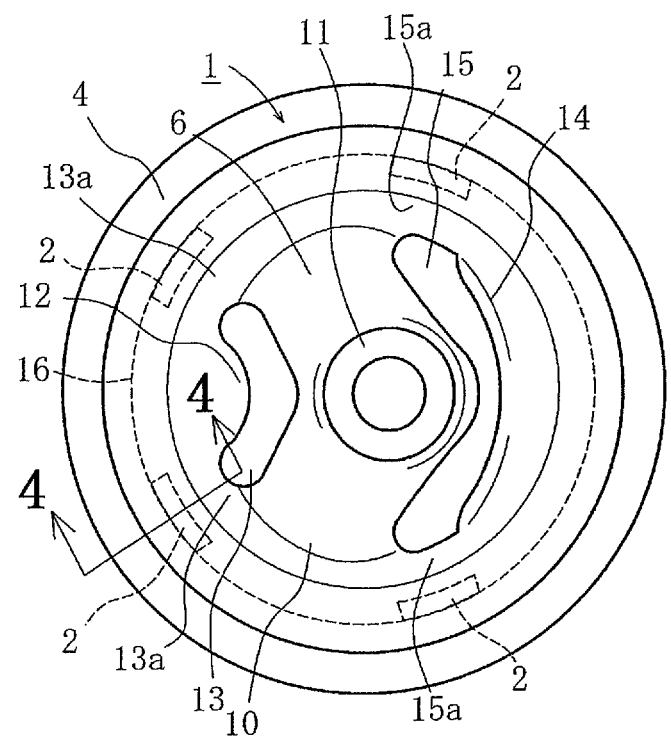
FIG. 3 is a diagrammatic plan view of a large bushing according to the second embodiment of the present invention.
Figure 4:
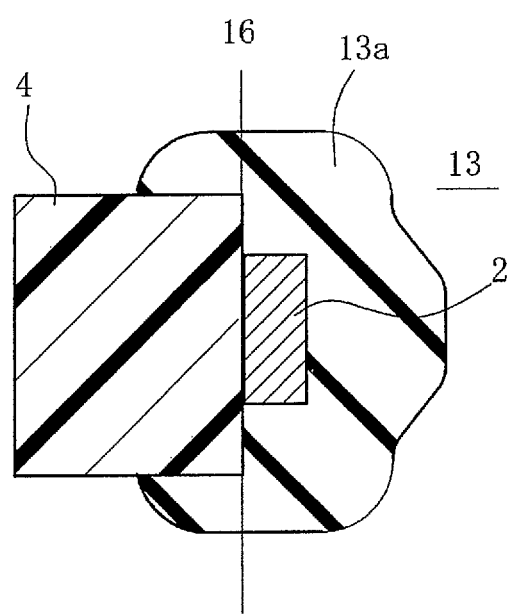
FIG. 4 is a cross sectional view taken along line 4-4 of FIG. 3.

FIG. 3 to FIG. 9 show the variations with respect to the location of the weight, wherein the large ring portion 4, the small ring portion 5, the large bushing 6 and the small bushing 7 are schematically illustrated. FIG. 3 and FIG. 4 show the second embodiment. As shown in FIG. 3, the weights 2 are arranged in locations 13*a* and 15*a* in the vicinity of each end in the right and left direction of the forward aperture 13 or the backward aperture 15. As shown in FIG. 4 which is a cross sectional view taken along line 4-4 of FIG. 3, the weight 2 is fixed to the inner peripheral wall of the large ring portion 4 by being covered overall by the rubber of the large bushing 6 in such a state that one side wall of the weight 2 contacts the inner peripheral wall of the large ring portion 4. The weight 2 and the large ring portion 4 are allowed to move on the contact surface relative to each other. However, as shown in FIG. 2, the weight 2 may be embedded in the rubber without contacting the inner peripheral wall of the large ring portion 4.

Figure 5:
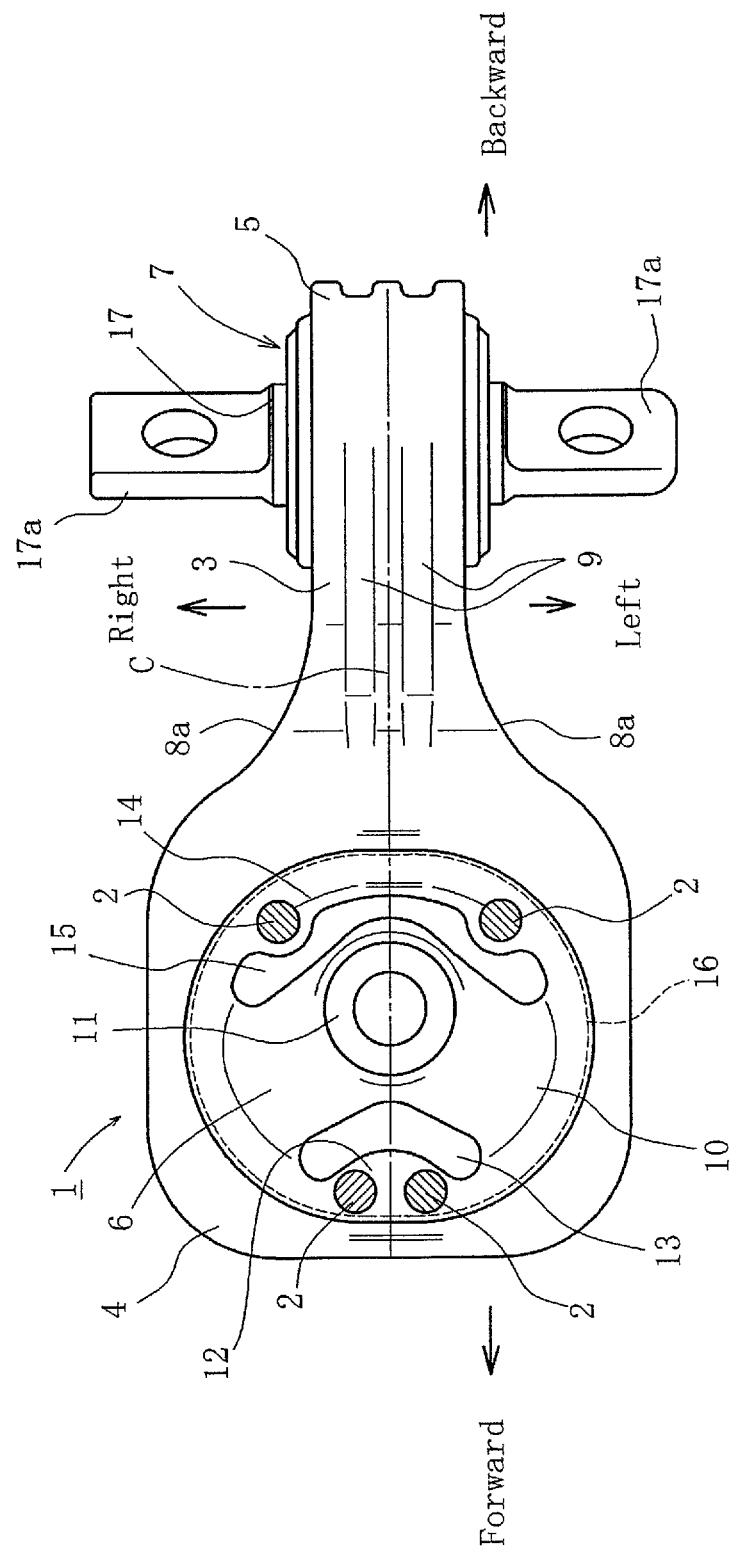
FIG. 5 is a view similar to FIG. 1, showing a weight formed in a round column shape according to the third embodiment of the present invention.

With this construction, the weights 2 are easily provided by utilizing the spaces 13*a* and 15*a* adjacent to the each end of the apertures 13 and 15 and away from the restraint line of the elastic arm portions 10 constituting the principal spring portion, and it is easy to have the weight 2 projected into the apertures where necessary. In addition, the weight 2 may take various shapes according to the conditions of the spaces to be located. The third embodiment as one of such examples is shown in FIG. 5 wherein the weight 2 is formed in a cylindrical shape (the cylindrical weight 2 being shown by hatching).

Further, since one lateral side of the weight 2 contacts the inner peripheral wall of the large ring portion 4 without being fixedly connected, the mutual vibration is not transmitted directly to the counterpart. Also, since the weight 2 and the large ring portion 4 are movable on the contact surface relative to each other, it allows each of them to move separately so as not to concentrate stress on the contact surface, whereby the durability can be improved.

Figure 6:
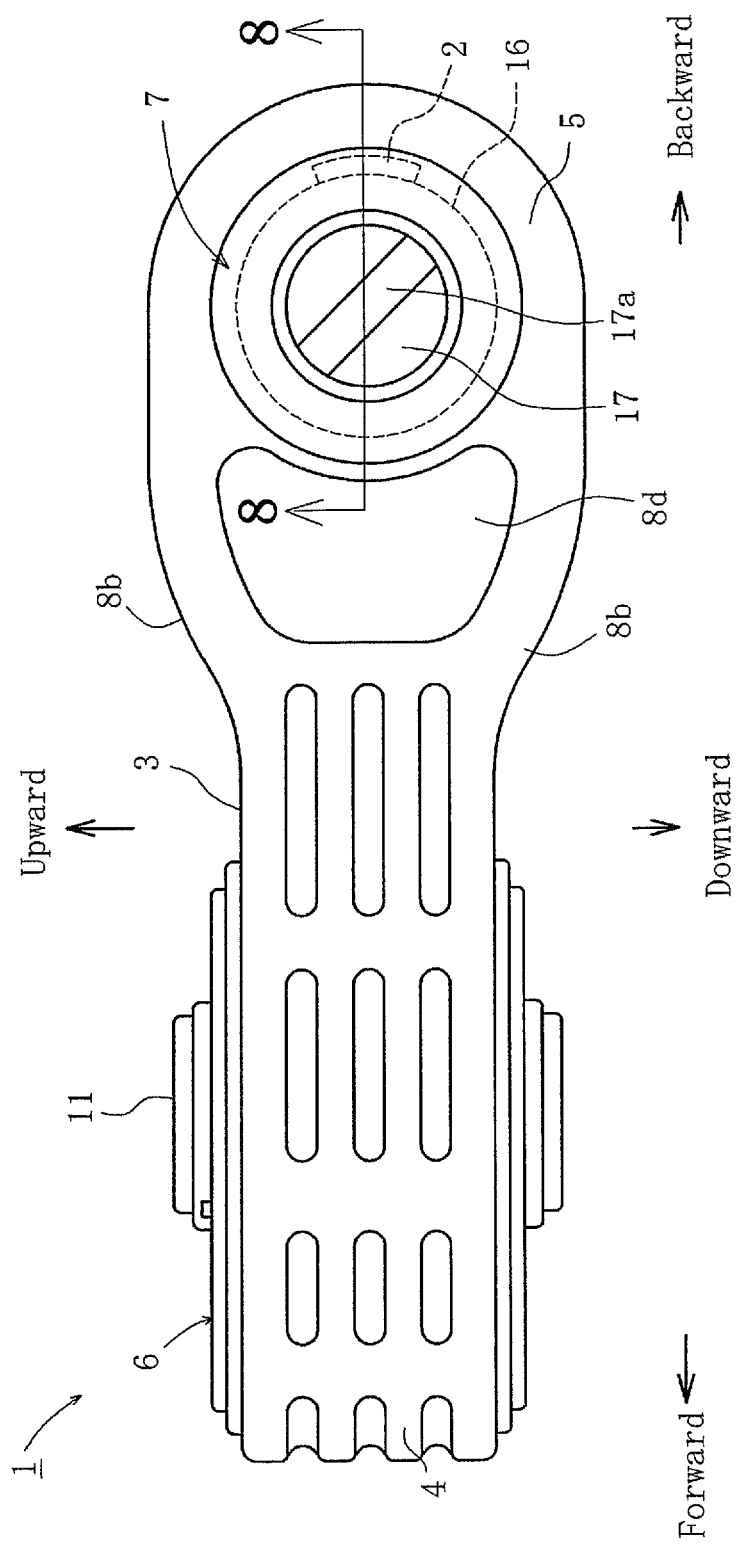
FIG. 6 is a front view of a torque rod according to the fourth embodiment of the present invention.
Figure 7:
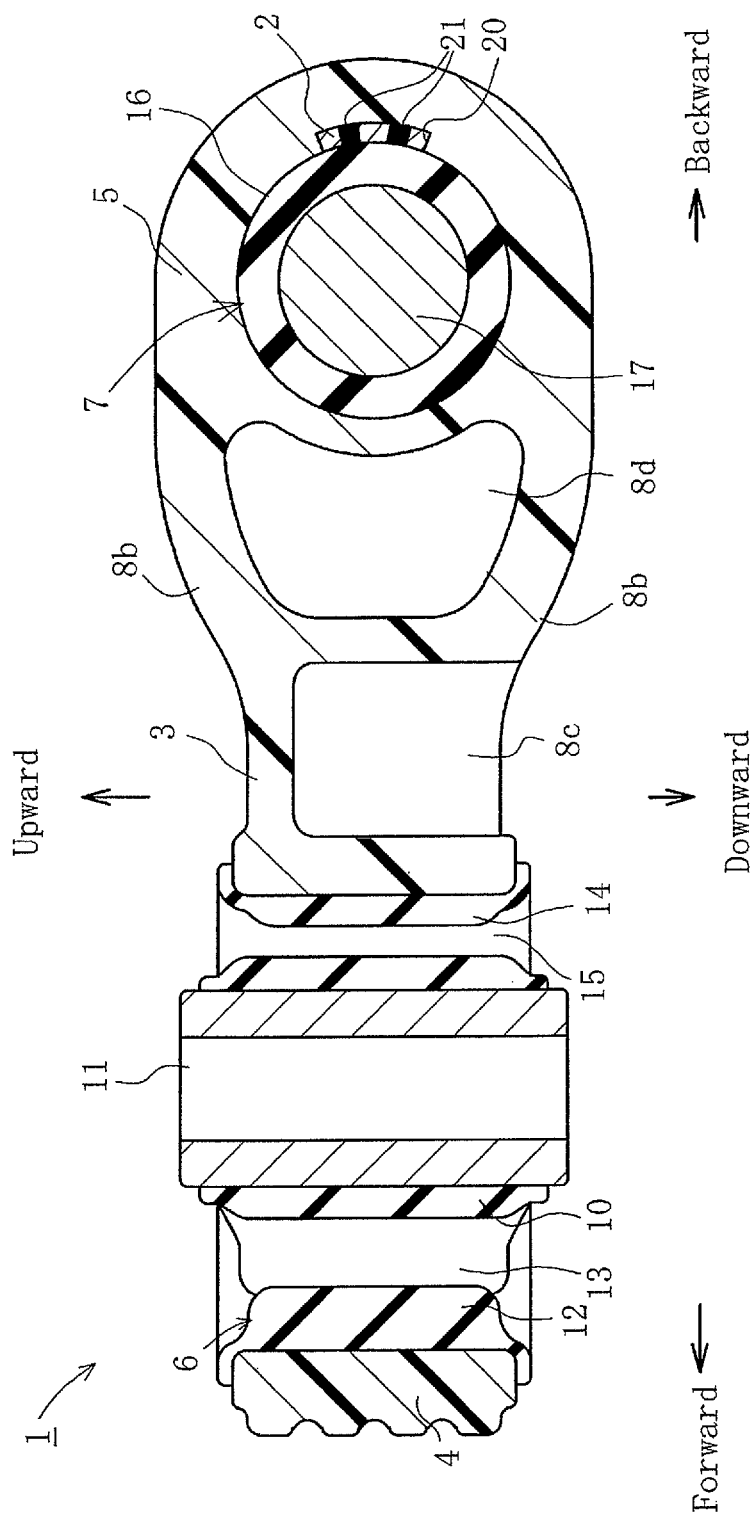
FIG. 7 is a cross sectional view showing locations similar to FIG. 2.
Figure 8:
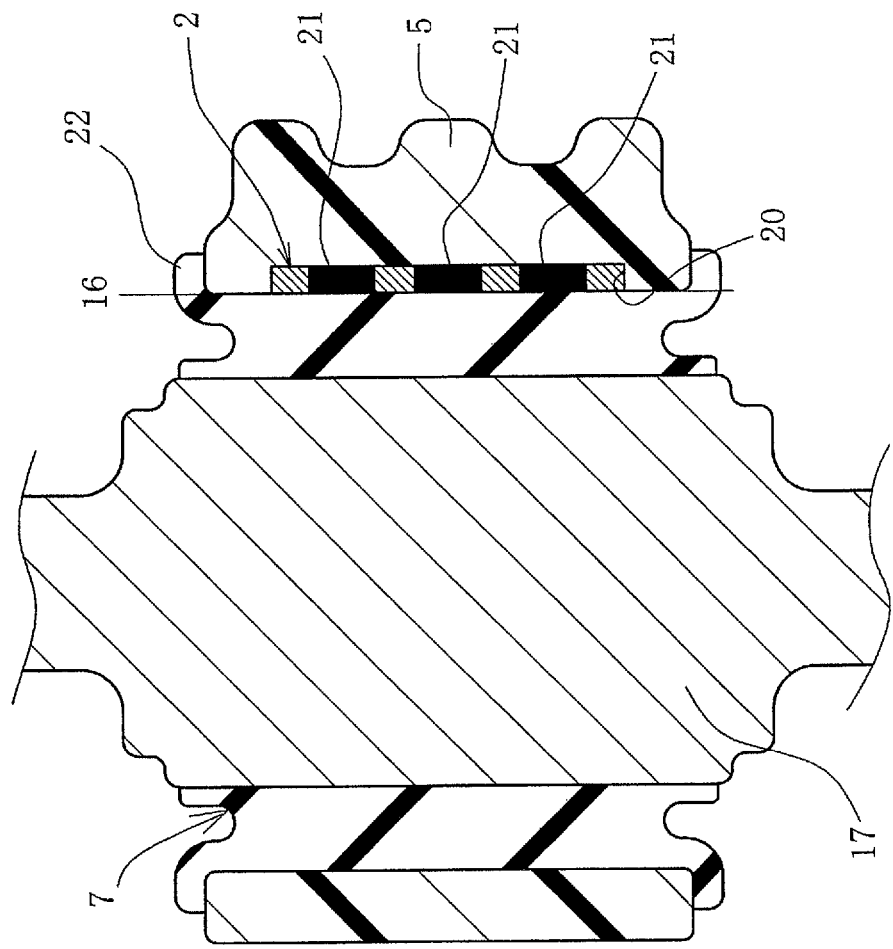
FIG. 8 is a cross sectional view taken along line 8-8 of FIG. 6.
Figure 9:
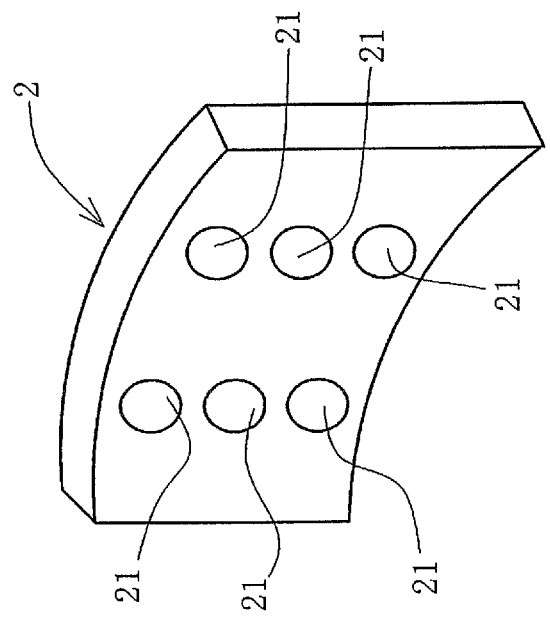
FIG. 9 is a perspective view of a weight.

FIG. 6 through FIG. 9 are in relation to the fourth embodiment of locating the weight 2 on the small bushing 7, wherein FIG. 6 is a front view in the direction of the inner shaft 17, FIG. 7 is a cross sectional view similar to FIG. 2, FIG. 8 is a cross sectional view taken along line 8-8 of FIG. 6 and FIG. 9 is a perspective view of the weight 2. In this example, the weight 2 is located outside of the restraint line 16.

As is apparent from FIG. 8, in the inner peripheral wall of the small ring portion 5 there is provided a groove-like concave 20 which is opened in the direction of the outer peripheral wall of the inner shaft 17. The weight 2 is accommodated in the concave 20 and is united as one body with the small ring portion 5 so as to cover the concave 20 with the small bushing 7, while simultaneously the small bushing 7 is united together with the small ring portion 5. The small bushing 7 is formed by injecting and vulcanizing the rubber between the inner shaft 17 and the small ring portion 5. At that time, the small bushing 7 is vulcanized and adhered to the weight 2 and the small ring portion 5. Moreover, a portion of the small bushing 7 overlaps an outer surface of the small ring portion 5 as an overlap portion 22 so as to reinforce the connection. However, the small bushing 7 may be prepared by molding the rubber in advance. Then, it is adhered to the small ring portion 5 and the weight 2. In this way, the weight 2 is united through the small bushing 7 with the small ring portion 5 without being fixedly connected thereto. However, since the weight 2 is located outside of the restraint line 16, it exerts no influence upon the principal spring portion of the small bushing 7.

Furthermore, the weight 2 can be assuredly retained inside of the small ring portion 5 through the rubber whereby there is no possibility that the weight 2 falls off the small ring portion 5 even in the long term use. Then, like a perspective view shown in FIG. 9, if a plurality of through holes 21, etc. are provided in the weight 2, when the small ring portion 7 is formed by the injection molding as above, the injected liquefied rubber passes through the through holes 21 and is adhered in the vulcanized state to the wall surface of the concave 20, whereby the connection between the small bushing 7, the small ring portion 5 and the weight 2 can be reinforced and the weight 2 can be firmly fixed further. In addition, while in this example the weight 2 is curved in an arc shape to extend along the inner peripheral wall of the small ring portion 5, it may be formed in a flat plate shape, a rod shape, a round shape, etc. if it is able to be housed within the concave 20.

While the invention has been described in its preferred forms, it is to be understood that the present invention is not limited to the above described embodiments, and various modifications and applications may be made within the scope and sprit of the invention. For example, the torque rod may be formed of a light alloy, etc. such as an aluminum alloy or the like without being limited to resin. In this case, it is necessary to adopt the material, such as a light alloy, whose specific gravity is lighter than iron. That is, even in the case where the torque rod is formed of the rigid material lighter than iron, the adjustment of resonant frequency due to the decrease in mass is easily performed by addition of the weight, and the stable mount of the weight can be done even in the long term use. Further, the torque rod according to the present invention is not limited to the use for the engine mount but may be applied to various kinds of devices such as a suspension link, etc.

What is claimed is:

1. A torque rod comprising an arm portion being formed of a material which is lower in specific gravity than iron, a ring portion being formed on each end in a longitudinal direction of said arm portion, and a rubber bushing being integrally provided with each of said ring portions, said ring portion having an inner peripheral wall, wherein a weight is fitted into a concave portion recessed in an inward direction of said inner peripheral wall of said ring portion such that said weight is located outside of a restraint line of said rubber bushing by said ring portion, said restraint line being formed by a joining surface between the inner peripheral wall of the ring portion and an outer peripheral wall of the bushing.

2. The torque rod according to claim 1, wherein a plurality of through holes extend through the weight and the bushing is adhered in a vulcanized state through the through holes to the wall surface of the concave portion.

3. The torque rod according to claim 1, wherein the weight is curved along the inner peripheral wall of said ring portion.

4. The torque rod according to claim 1, wherein the concave portion is opened toward an inner cylinder direction.

5. The torque rod according to claim 1, wherein the concave portion is provided on a portion of peripheral direction of the ring portion.

* * * * *